No. 733,278. PATENTED JULY 7, 1903.
J. ROSENBAUM.
APPARATUS FOR SAWING WOOD.
APPLICATION FILED JULY 30, 1902.
NO MODEL.
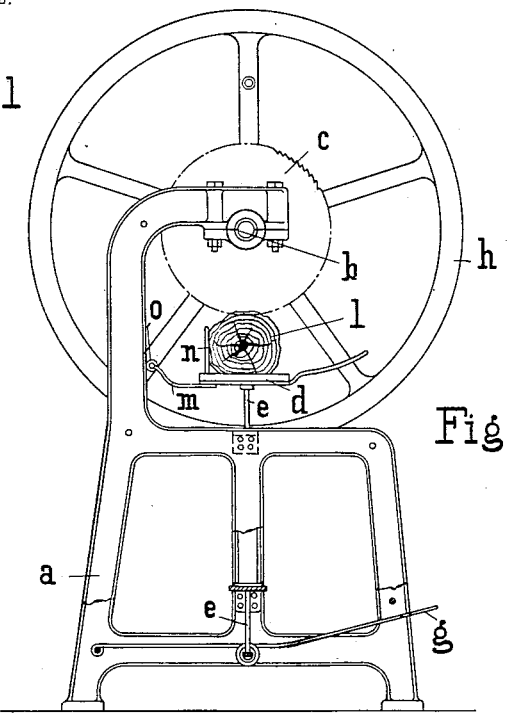
Fig.1
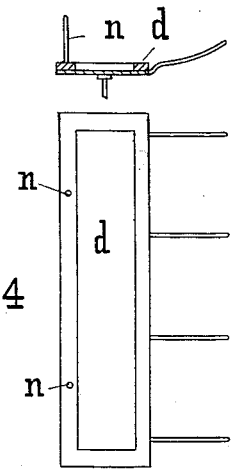
Fig.3
Fig.4
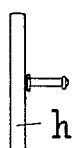
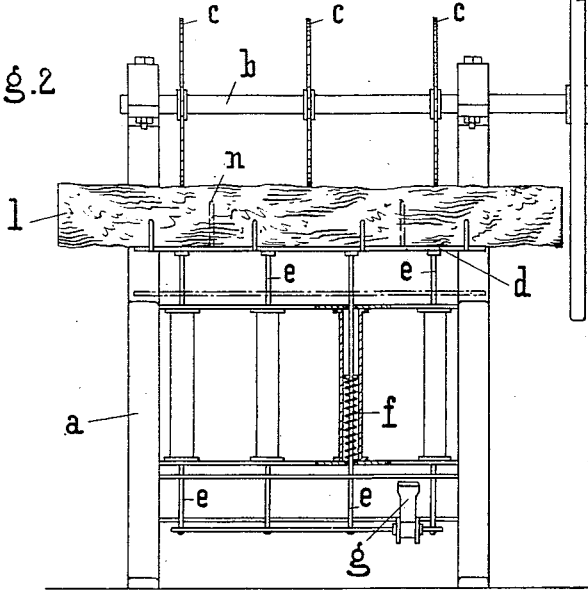
Fig.2
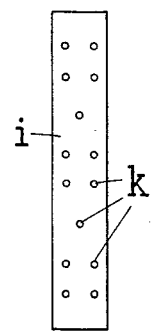
Fig.5
Witnesses:
Ludwig Flum
Hiroshi Mori
Inventor
Josef Rosenbaum
by B. Singer Att'y.

No. 733,278. Patented July 7, 1903.

UNITED STATES PATENT OFFICE.

JOSEF ROSENBAUM, OF NUREMBERG, GERMANY.

APPARATUS FOR SAWING WOOD.

SPECIFICATION forming part of Letters Patent No. 733,278, dated July 7, 1903.

Application filed July 30, 1902. Serial No. 117,634. (No model.)

*To all whom it may concern:*

Be it known that I, JOSEF ROSENBAUM, a subject of the Emperor of Germany, residing at Nuremberg, Bavaria, Germany, have invented certain new and useful Improvements in Apparatus for Sawing Up Wood, of which the following is a specification.

This invention has for its object a machine which is intended for sawing or cutting wood, more particularly fire-wood, into several pieces.

The machine is shown in the accompanying drawings, in which—

Figure 1 is an end elevation of the machine; Fig. 2, a front view thereof; Fig. 3, a cross-section, and Fig. 4 a plan view, of the work-table, and Fig. 5 a plan view of a filling-plate adapted to be inserted in the recess in the table.

The machine consists of a framework $a$ with a suitably-mounted shaft $b$, on which is a hand-rotated fly-wheel or belt-pulley $h$. Several circular-saw blades $c$ are fixed on the shaft $b$ at suitable intervals apart.

In the under part of the frame $a$ a work-table $d$ with guide-bars $e$ is mounted on springs $f$. By means of a suitable treadle $g$, connected with this table, the latter may be depressed against the action of the springs. The upper surface of the table is, as shown in Figs. 3 and 4, preferably made recessed or countersunk, so as to give more clearance for the saw-blades, and when necessary a filling-plate $i$, Fig. 5, having grip or pin holes $k$, may be inserted in this recess.

The wood $l$ is laid on the table $d$ after the latter has been depressed and is brought within range of the action of the circular-saw blades $c$ by releasing the treadle $g$, when the driving apparatus $h$ is set in operation. In order to support the wood, so as to counteract the side thrust produced by the working of the saw-blades $c$, struts $n$ are provided on the table $d$ between the points at which the saw-blades work. The table itself is supported on the frame $a$ to resist the thrust action of the saws by arms $m$, having rollers $o$, which roll upon the frame-standards.

What I claim is—

1. In a wood-sawing machine, the combination with a frame and a gang of circular saws supported thereby, of a vertically-movable spring-supported table under the saws, substantially as described.

2. In a wood-sawing machine, the combination with the frame and the circular saws supported thereby, of the vertically-movable table having arms with rollers bearing against the frame to resist the saw thrust, substantially as described.

3. In a wood-sawing machine the combination with a frame and a saw supported thereby, of the vertically-movable table under the saw, guide-bars thereunder connected to a treadle, springs coiled around the guide-bars and tending to raise the table, and arms projecting from the table having rollers traveling on the frame, substantially as described.

In testimony whereof I affix my signature in presence of two witnesses.

JOSEF ROSENBAUM.

Witnesses:
LEBERECHT HUBER,
OSCAR BOCK.